US009509028B2

(12) United States Patent
Xie et al.

(10) Patent No.: US 9,509,028 B2
(45) Date of Patent: Nov. 29, 2016

(54) MICROBIAL BATTERIES WITH RE-OXIDIZABLE SOLID-STATE ELECTRODES FOR CONVERSION OF CHEMICAL POTENTIAL ENERGY INTO ELECTRICAL ENERGY

(71) Applicant: The Board of Trustees of the Leland Stanford Junior University, Palo Alto, CA (US)

(72) Inventors: Xing Xie, Stanford, CA (US); Yi Cui, Stanford, CA (US); Craig S. Criddle, Redwood City, CA (US); Meng Ye, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/430,500

(22) PCT Filed: Oct. 2, 2013

(86) PCT No.: PCT/US2013/063101
§ 371 (c)(1),
(2) Date: Mar. 23, 2015

(87) PCT Pub. No.: WO2014/055671
PCT Pub. Date: Oct. 4, 2014

(65) Prior Publication Data

US 2015/0214590 A1 Jul. 30, 2015

Related U.S. Application Data

(60) Provisional application No. 61/709,047, filed on Oct. 2, 2012.

(51) Int. Cl.
*H01M 8/16* (2006.01)
*H01M 12/08* (2006.01)
*H01M 4/36* (2006.01)
*H01M 4/48* (2010.01)
*H01M 4/54* (2006.01)
*H01M 4/90* (2006.01)

(52) U.S. Cl.
CPC ............ *H01M 12/08* (2013.01); *H01M 4/366* (2013.01); *H01M 4/48* (2013.01); *H01M 4/54* (2013.01); *H01M 4/90* (2013.01); *H01M 8/16* (2013.01); *Y02E 60/50* (2013.01)

(58) Field of Classification Search
CPC ........... H01M 8/16; H01M 8/18; H01M 8/20
See application file for complete search history.

(56) References Cited

U.S. PATENT DOCUMENTS

2009/0305083 A1* 12/2009 Karamanev ....... H01M 8/04186 429/2

* cited by examiner

*Primary Examiner* — Stewart Fraser
*Assistant Examiner* — Olatunji Godo
(74) *Attorney, Agent, or Firm* — Lumen Patent Firm

(57) ABSTRACT

A microbial battery is provided. At the anode, microbial activity provides electrons to an external circuit. The cathode is a solid state composition capable of receiving the electrons from the external circuit and changing from an oxidized cathode composition to a reduced cathode composition. Thus, no external source of oxygen is needed at the cathode, unlike conventional microbial fuel cells. The cathode can be removed from the microbial battery, re-oxidized in a separate oxidation process, and then replaced in the microbial battery. This regeneration of the cathode amounts to recharging the microbial battery.

5 Claims, 5 Drawing Sheets

MICROBIAL BATTERIES WITH RE-OXIDIZABLE SOLID-STATE ELECTRODES FOR CONVERSION OF CHEMICAL POTENTIAL ENERGY INTO ELECTRICAL ENERGY

CROSS-REFERENCE TO RELATED APPLICATIONS

This application is a 371 of PCT/US2013/063101 filed on Oct. 2, 2013. PCT application PCT/US2013/063101 filed on Oct. 2, 2013 claims the benefit of U.S. Provisional Application 61/709,047 filed on Oct. 2, 2012.

FIELD OF THE INVENTION

This invention relates to production of electrical power using microbial activity.

BACKGROUND

Fuel cells have been used for many years to provide electrical power from chemical reactions. The use of microbes in fuel cells to provide the necessary chemical reactions has also been extensively investigated. Such fuel cells are known as microbial fuel cells (MFCs). At the anode of an MFC, microbes oxidize the electron donors and transfer the electrons to an electrode. At the MFC cathode, electrons are received and oxygen gas is reduced. Unfortunately, energy recovery in MFCs suffers from several significant and undesirable reductions in efficiency. These issues include voltage loss from reduction of $O_2$ at the cathode, diffusion of dissolved $O_2$ into the anode compartment, and methane production in the anode compartment. Accordingly, it would be an advance in the art to provide improved microbial chemical to electrical energy conversion.

SUMMARY

The present approach departs from a conventional microbial fuel cell by having a re-oxidizable solid-state cathode. Such a cathode changes its composition from an oxidized cathode composition to a reduced cathode composition when operated to provide electrical power. The cathode can be changed from the reduced cathode composition to the oxidized cathode composition in a separate oxidation process (i.e., regenerated). The resulting structure is analogous to a rechargeable battery, where regeneration of the cathode effectively recharges the battery. Thus, we refer to the present approach as providing a microbial battery (MB).

DETAILED DESCRIPTION

1) Introduction

Figure 1A:
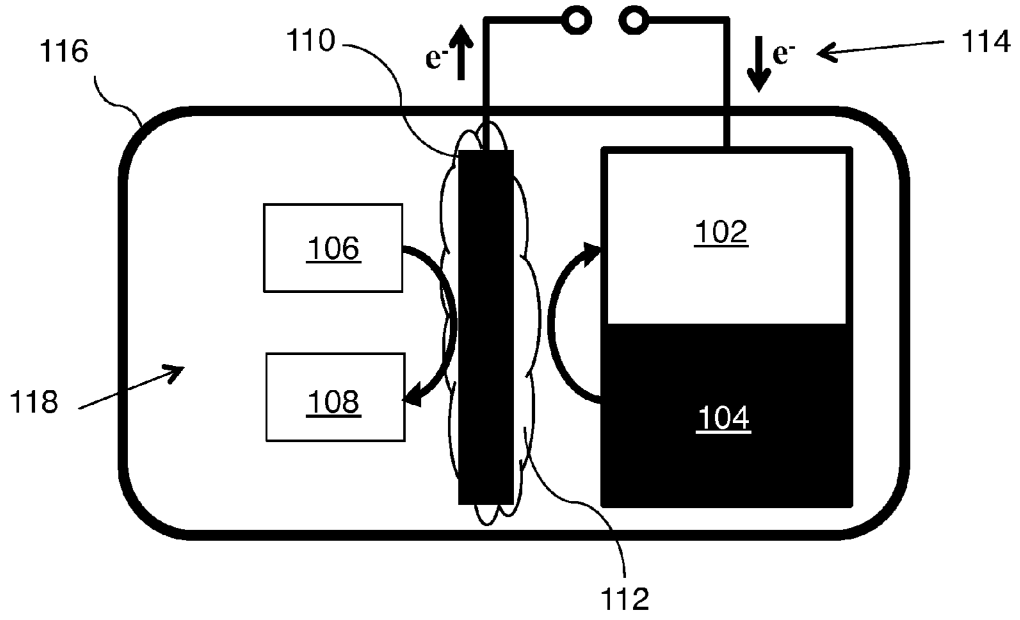
FIG. 1A shows operation of a microbial battery to provide electrical power.

Current global energy demand is approximately $5.3\times10^{20}$ Joules/year. Most of this demand (>80%) is met by extraction and oxidation of the fossil carbon present in concentrated organic reservoirs as oil (32%), coal (27%), and natural gas (21%). About 31% ($1.7\times10^{20}$ Joules/year) is used to produce $7.7\times10^{19}$ Joules/year of electrical energy with an energy conversion efficiency of ~46%. The proven untapped reserves of oil, coal, and natural gas are $9.1\times10^{22}$ Joules. Without carbon sequestration, these supplies would result in significant greenhouse gas emissions. Identification of supplies that avoid such releases is a pressing challenge. One promising option is the use of less-concentrated reservoirs of organic matter. An untapped resource is the organic matter in marine sediment, estimated to contain $5.2\times10^{22}$ Joules of stored chemical energy if oxidized with oxygen. Other reservoirs of less-concentrated organic matter are also as yet untapped—in part because they are often viewed as "waste", and in part because the technology needed to recover energy from less-concentrated reservoirs is inefficient. If not oxidized, these organics can deplete the oxygen reserves of aquatic ecosystems and stimulate release of methane to the atmosphere. An example is domestic wastewater, a threat to aerobic aquatic ecosystems. The organic matter in domestic wastewater is theoretically sufficient to generate ~$7.4\times10^{18}$ Joules/year: 3-4 times more energy than is needed to treat the wastewater. Yet 3% of the electrical load of developed countries is currently required to treat wastewater. Another "waste" example is the biomass produced through photosynthesis, most of which is not used for human needs. Globally, $4.5\times10^{21}$ Joules/year are stored in biomass generated by photosynthesis. About 1% ($5.0\times10^{19}$ Joules/year) is harvested for human energy needs. The remaining biomass can undergo uncontrolled anaerobic biodegradation, with ensuing greenhouse gas emissions.

Effective energy extraction from less-concentrated organic reservoirs can potentially be achieved with microbial biotechnology. Self-assembled microbial communities have optimized energy extraction systems that allow efficient in-situ oxidation of organic matter and other electron donors in diverse environments. Because these systems evolved under strong competitive pressures to meet microbial needs for energy, hijacking them for human purposes requires understanding of factors that influence microbial competition for energy. The most important factor is the nature of the available oxidants. In reservoirs rich in electron donors, the strongest oxidant ($O_2$ in aerobic systems) is used first, followed by use of progressively weaker oxidants ($NO_3^-$>Mn(IV) minerals>Fe(III) minerals>$SO_4^{2-}$>$CO_2$). Carbon dioxide, the least powerful oxidant, is used last, and is often the sole remaining oxidant in electron donor-rich anaerobic environments. A significant fraction of the electrons removed (~90%) is transferred to methane which can concentrate in the gas phase. The high efficiency of electron transfer to methane and the ease of methane recovery from water make methane fermentation a useful benchmark for energy recovery via microbial biotechnology. But use of methane fermentation for energy generation has limitations: efficient digestion of biomass requires hydrolysis and fermentation at warm temperatures (>20° C.); inefficient capture of methane and losses during transport lead to energy losses, greenhouse gas emissions, and explosion hazards; and the collected biogas often requires clean-up to remove contaminants (hydrogen sulfide, siloxanes), limiting applications to large-scale digesters.

Microbial fuel cells (MFCs) offer an option for direct electricity generation from electron donors oxidized by microorganisms, and have been used to recover electricity from domestic wastewater and marine sediment. Like chemical fuel cells, oxidation occurs at an anode, and electrons pass through an external circuit to a cathode where $O_2$ is reduced. At the anode, however, chemical catalysts are replaced by exoelectrogens—microorganisms that oxidize the electron donors and transfer the electrons to an electrode. For MFCs, energy recovery is limited by a voltage loss when $O_2$ is reduced at the cathode. This loss is exacerbated by MFC operating conditions—atmospheric pressure, ambient temperature, and an aqueous electrolyte at near neutral pH. Diffusion of dissolved $O_2$ into the anode compartment is also a problem, allowing formation of aerobic biomass and oxidation of organic matter without energy production. Finally, methane production is sometimes reported in the anode compartment. This represents yet another energy loss, and signals that methanogens are outcompeting exoelectrogens for the available electrons. Building on previous MFC studies, this work introduces a new microbial electrochemical device for energy recovery where the key difference is the use of a solid-state cathode to replace the oxygen gas cathode of a MFC. Operation of the anode is like that of an MFC anode, but operation of the cathode is like that of a rechargeable battery. We therefore refer to this device as a "microbial battery (MB)".

2) General Principles

Figure 1B:
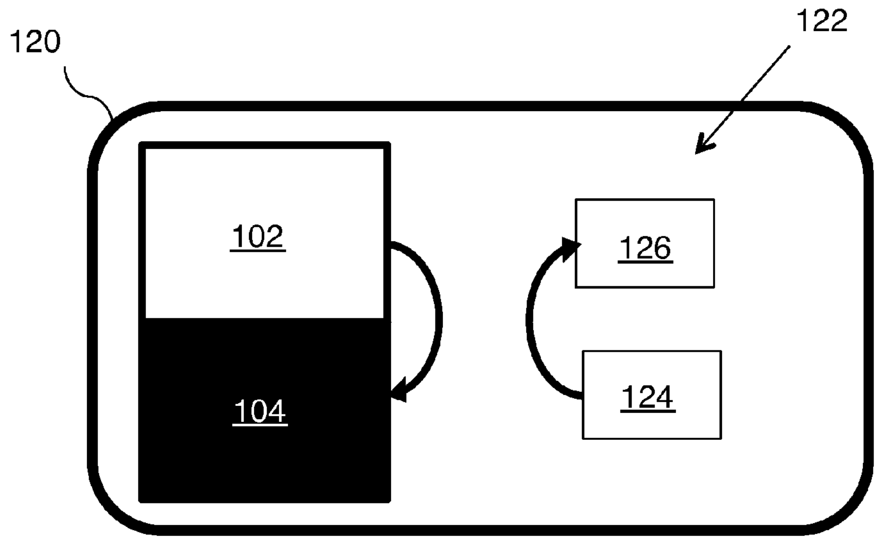
FIG. 1B shows regeneration of the cathode of a microbial battery.

FIGS. 1A-B show operating principles of the microbial battery. FIG. 1A relates to a discharging operation analogous to a battery, where chemical reactions occur that provide useful electrical power as an output. FIG. 1B relates to a charging operation, where the cathode is regenerated for future use in the discharge mode of FIG. 1A.

More specifically, an anode 110 is configured such that microbial activity at the anode provides electrons to an external circuit 114. For example, a biofilm 112 can be present at anode 110 for such microbial activity. This microbial activity can be regarded as oxidation of initial electron donors 106 (e.g., $C_6H_{12}O_6$, $CH_4$) to provide oxidized electron donors 108 (e.g., $CO_2$, $H_2O$). A cathode 102/104 receives electrons from external circuit 114 and changes its composition from an oxidized cathode composition 104 to a reduced cathode composition 102 as this reaction proceeds. In the case of a silver-oxide/silver cathode, silver metal is produced. The anode and cathode are disposed in an aqueous solution 118 in a reaction chamber 116.

The cathode is configured such that it can be changed from the reduced cathode composition 102 to the oxidized cathode composition 104 in a separate oxidation process outside the microbial battery. FIG. 1B schematically shows this cathode regeneration process. Here a separate reaction chamber 120 includes contents 122 suitable for fostering reactions where the reduced cathode composition 102 changes to the oxidized cathode composition 104. Such reactions entail conversion of terminal electron acceptors 124 (e.g., $O_2$, $H_2O$, $CO_2$) to reduced electron acceptors 126 (e.g., $H_2O$, $H_2$, fuel).

The oxidized cathode can then be reinstalled in the microbial battery—a step that differs only slightly from the normal process used to recharge batteries—and the process is repeated. The major drawbacks of MFCs—voltage losses at oxygen cathodes and diffusion of oxygen into the anode compartment—are avoided by single chamber operation without the introduction of oxygen.

As described below, experiments have been performed with the Ag/AgO redox couple as the cathode. Here the reduced cathode composition 102 is silver and the oxidized cathode composition 104 is silver oxide. Suitable compositions and/or redox couples for the cathode include but are not limited to: oxides or hydroxides of X with its reduced form where X can be Ag, Cu, Fe, Ni, Mn, V, Zn or any alloy thereof; cytochromes; conducting polymers; and Prussian blue analogues.

Preferably, the reduced cathode composition and the oxidized cathode composition are both solid state compositions. Here we define 'solid state composition' as any composition or mixture that maintains its structural integrity in operation (i.e., as it changes between oxidized states and reduced states). Thus, a solid state composition can include soluble species, provided the composition as a whole maintains its structural integrity. For example, soluble Fe(II) species can be part of a solid state composition if bound in a matrix of insoluble Fe(III) species.

Preferably, the chemical reaction that changes the oxidized cathode composition to the reduced cathode composition releases $OH^-$ ions into the aqueous solution or takes $H^+$ ions from the aqueous solution. This helps to maintain a consistent pH during operation of the microbial battery. Preferred pH ranges are from 6-9 (normal microbes) and from 1-11 (extremophile microbes). The cathode is preferably resistant to microbial growth. The can be achieved by choice of cathode composition (e.g., the antibiotic properties of silver) and/or by use of ion-permeable thin films as described below.

Practice of the invention does not depend critically on the nature of the microbial activity at the anode. Any microbial activity capable of providing electrons to the external circuit can be employed, such as biological metabolism of one or more reduced species including but not limited to: organic compounds, reduced nitrogen compounds, reduced sulfur compounds, reduced metals, reduced metalloids, and hydrogen. The temperature, pressure, pH and other operating conditions of the microbial battery can be any conditions suitable for activity of the relevant microbes. For microbes which are extremophiles, the resulting operating conditions may depart significantly from atmospheric pressure, near room temperature and/or near-neutral pH.

Practice of the invention also does not depend critically on how the cathode is re-oxidized to recharge the MB. Any cathode oxidization process can be employed, including but not limited to: corroding the cathode by exposure to one or more oxidants, oxidizing the cathode with an electrochemical reaction, and oxidizing the cathode with microbially mediated oxidation. A catalyst can be employed to facilitate cathode oxidization. Suitable oxidants for oxidizing the cathode include, but are not limited to: oxygen, water, carbon dioxide, sulfates, sulfites, nitrates, nitrites, perchlorates, and chlorates. Here 'oxidizing the cathode with an electrochemical reaction' is defined as covering both electrochemical reactions that provide current flow as they proceed (e.g., battery type reactions), and reactions that require current as an input to proceed (e.g., electrolysis).

Figure 1C:
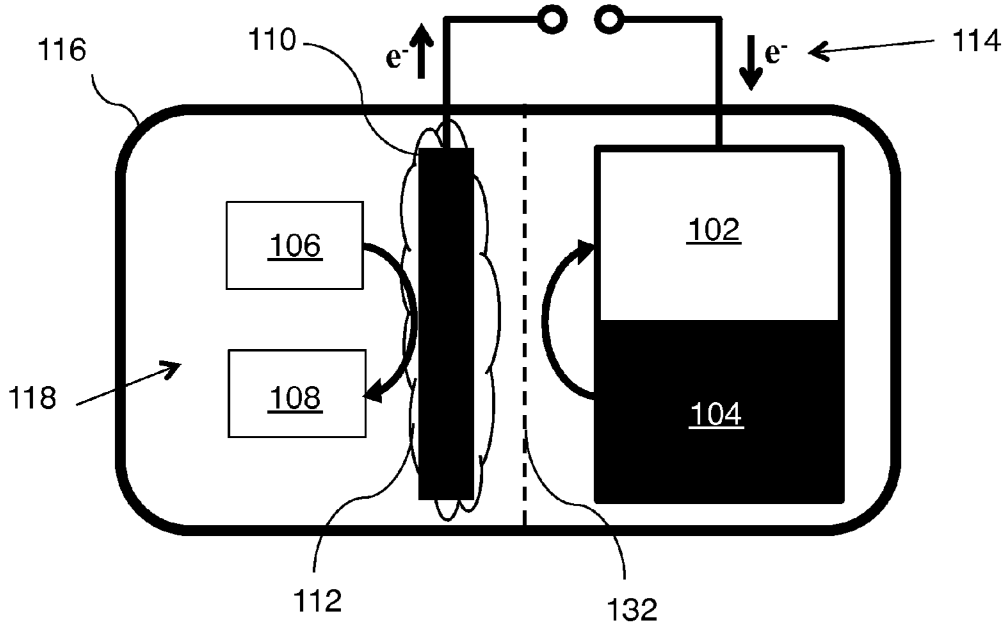
FIGS. 1C-D show variations of the example of FIG. 1A.
Figure 1D:
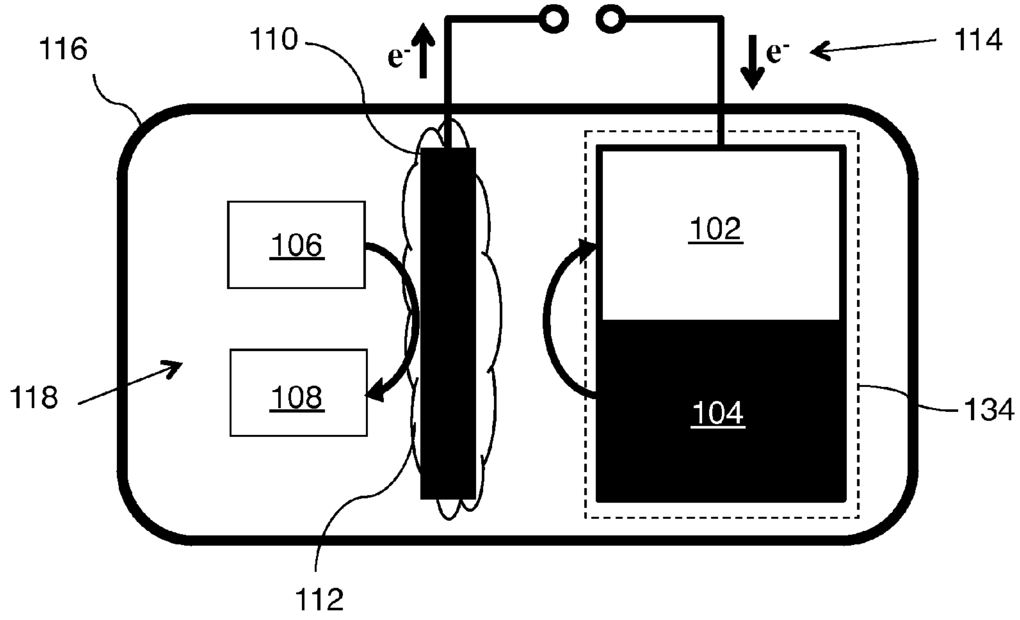

Although a microbial battery can operate without any ion permeable thin films being present, it may be useful to add such films in some cases. FIGS. 1C-D show some exemplary configurations. The example of FIG. 1C shows one or more ion permeable thin films 132 disposed to separate anode 110 from cathode 102/104. The example of FIG. 1D shows one or more ion permeable thin films 134 disposed to cover cathode 102/104. Such thin films can have various purposes. One function they can serve is to reduce microbial growth at the cathode. Another function they can serve is to decrease parasitic chemical reactions where reduced species are consumed without current flow in the external circuit.

3) Experimental Demonstration

A design challenge for the MB is identification of a stable solid-state electrode with a suitable electrochemical potential. One candidate couple is silver-oxide/silver ($Ag_2O$/Ag), a couple that has been used for decades in batteries. This couple offers several advantages: 1) both silver and silver-oxide remain in the solid state in water and are stable under conditions favorable for microbial growth, i.e., ambient pressure and temperature and near neutral pH; 2) the standard reduction potential at pH 7 is 0.76 V vs. standard hydrogen electrode (SHE)—a value that is higher than the value for other electron acceptors commonly present in anaerobic environments (such as $SO_4^{2-}$ and $CO_2$), but lower than oxygen evolution (0.82 V vs. SHE at pH 7); 3) the potential difference between the anode and the silver-oxide electrode is large enough to support energy extraction for human needs and to also sustain exoelectrogen growth and competition for electron donors; 4) hydroxyl alkalinity generated by reduction of silver-oxide to silver at the cathode neutralizes acidity produced at the anode; and 5) silver has well documented antimicrobial properties, preventing growth of microorganisms on the silver-oxide electrode and enabling operation within a single chamber without an ion exchange membrane.

FIGS. 2A-D show carbon cloth supported silver-oxide cathode (A and B) and carbon cloth microbial anode (C and D). (A) Scanning electron microscope (SEM) images of a silver-oxide electrode. The particles are less than 50 nm. (B) Reduction potential of a silver-oxide electrode in a phosphate buffer solution (PBS, 200 mM, pH 7) at current densities ranging from 0.01 to 1 mA/cm$^2$. Current density values are labeled above the potential curve. The dashed line indicate the standard reduction potential. (C) SEM images of a colonized carbon cloth electrode. Zoom-in image (inset) shows a cluster of exoelectrogens connected by microbial nanowires. (D) Cyclic voltammograms (CVs) of a colonized carbon cloth electrode 202 and a plain carbon cloth electrode 204 in a glucose electrolyte (~1 g/L). Scan rate, 1 mV/s.

Figure 2A:
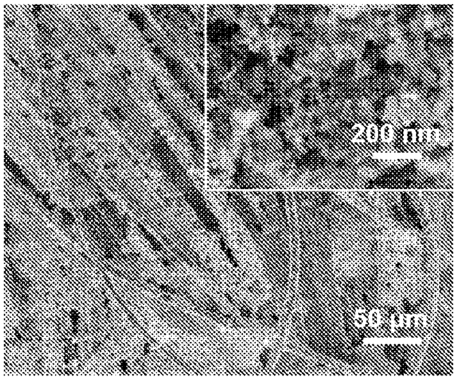
FIG. 2A is a scanning electron microscope (SEM) image of a carbon cloth supported solver-oxide cathode.
Figure 2B:
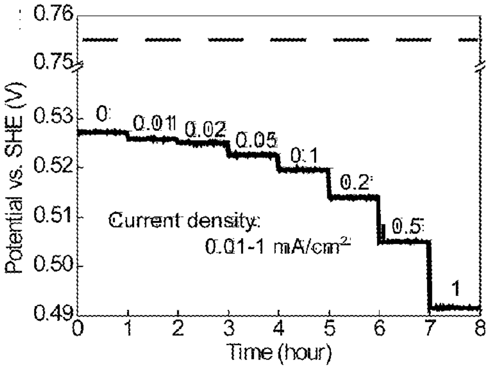
FIG. 2B show the reduction potential of the cathode of FIG. 2A for several current densities.

Electrode samples were prepared by embedding silver nanoparticles on a carbon cloth substrate followed by electrochemical oxidation. X-ray diffraction (XRD) verified the formation of silver-oxide. Scanning electron microscope (SEM) images of the electrode surface are shown in FIG. 2A. The silver-oxide electrodes were tested in a phosphate buffer solution (PBS, 200 mM, pH 7) to simulate operational conditions in MBs. The reduction potential under different current densities was recorded (FIG. 2B). Electrode potentials were constant during reduction, indicating that solid-phase reduction of silver-oxide to silver was stable. With reducing currents that varied from 0.01 to 1 mA/cm$^2$ (a typical operating current density range for microbial anodes), the reduction potentials of the electrodes remained stable at 0.53 to 0.49 V vs. SHE (FIG. 2B). These values were much higher than those of oxygen reduction (from 0.43 to −0.07 V vs. SHE) catalyzed by a commercially available platinum (Pt) electrode (Pt nanoparticles on a carbon cloth substrate) under the same conditions. Higher voltage outputs are attributed to lower overpotential losses (0.23-0.27 V for $Ag_2O$ vs. 0.39-0.89 V for $O_2$), and the superior electrochemical properties of the $Ag_2O$/Ag couple. When the same $Ag_2O$/Ag electrode was operated in a sodium hydroxide electrolyte (NaOH, 1 M, pH 14), a typical condition in $Ag_2O$/Ag batteries, the overpotential loss was less than 0.05 V at a current density of 1 mA/cm$^2$. The greater losses observed in the PBS electrolyte were probably due to surface changes in the $Ag_2O$/Ag electrode at neutral pH or local increase in pH near the $Ag_2O$/Ag electrode surface during reduction.

Figure 2C:
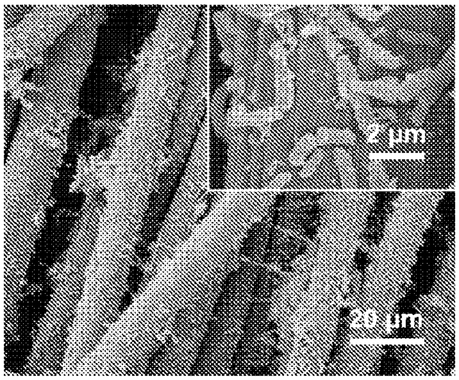
FIG. 2C is an SEM image of a carbon cloth anode colonized by microbes.
Figure 2D:
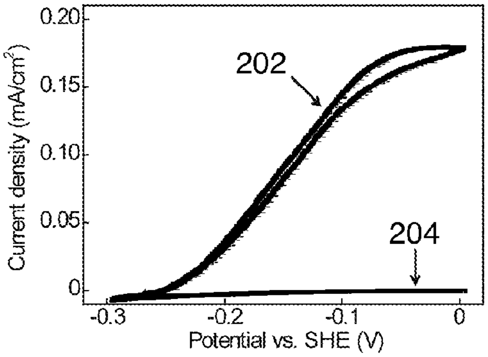
FIG. 2D shows cyclic voltammograms of the anode of FIG. 2C compared with an un-colonized carbon cloth electrode.

The anode materials for MBs can be carbon cloth, graphite brush, or carbon nanotube/graphene coated macroporous substrate, like sponge. FIG. 2C shows SEM images of a commercially available carbon cloth electrode colonized by exoelectrogens. The exoelectrogens remove electrons from electron donors in the electrolyte and transfer the electrons to the electrode by direct surface contact, diffusion of electron shuttles, and/or conduction through microbial nanowires. Cyclic voltammetry (FIG. 2D) established that exoelectrogens were actively oxidizing organics: In electrolyte amended with glucose (~1 g/L, an electron equivalent concentration similar to that of typical domestic wastewater), a positive current peak resulted from the oxidation of glucose (FIG. 2D). This result was confirmed with electrochemical impedance spectroscopy.

FIGS. 3A-D show performance of glucose-fed MBs and regeneration of the solid-state $Ag_2O$/Ag electrode. (A) Potentials of the microbial anode and the $Ag_2O$/Ag electrode during oxidation of a glucose solution (~1 g/L) at a fixed current density of 0.1 mA/cm$^2$. The arrows indicate regeneration of the $Ag_2O$/Ag electrode. (B) Polarization curves show the applied voltage and potentials of both electrodes during regeneration of the $Ag_2O$/Ag electrode with $O_2$ reduction catalyzed by a commercially available carbon cloth supported platinum (Pt) electrode. The electrolyte was a sodium hydroxide (NaOH, 1 M, pH 14) solution bubbled with air (~100 mL/min). After changing the current density, potentials were recorded until equilibrium was reached (at least 10 minutes). (C, D) Voltage profiles of plate-shaped MBs with different external loadings (C), and in three consecutive cycles with a 2000Ω loading. The MBs were equipped with pre-colonized carbon cloth anodes and silver-oxide cathodes. The feeding was a glucose solution (~1 g/L). The arrows in (D) indicate the replacement of fresh glucose feeding and the regeneration of the $Ag_2O$/Ag electrode.

Figure 3A:
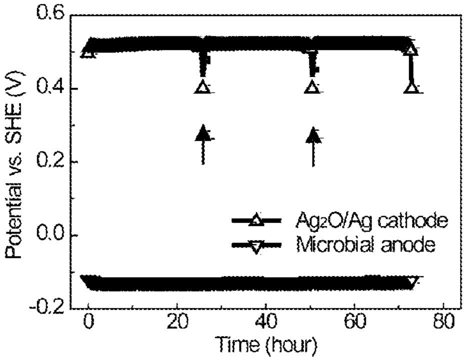
FIGS. 3A-D show performance of an exemplary microbial battery.
Figure 3B:
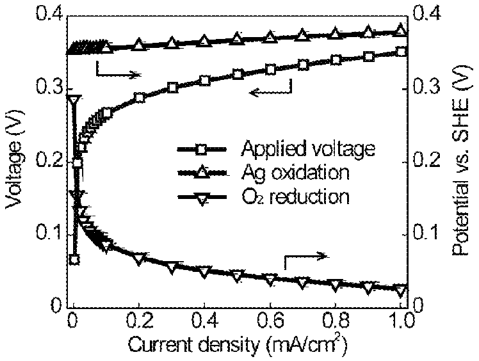

Single-chamber MBs were built by placing the pre-colonized microbial anodes and silver-oxide cathodes into a bottle containing 100 mL glucose electrolyte (~1 g/L). The potentials of the microbial anode and the $Ag_2O$/Ag electrode were recorded for a fixed current density of 0.1 mA/cm$^2$. As shown in FIG. 3A, the anode potential was stable at −0.12 V vs. SHE. This indicates that anode microbial activity was not affected by co-location of the $Ag_2O$/Ag electrode in the same chamber. Because of the volume of the system was large and the current relatively small, the decrease in glucose levels was not large enough to change the anode potential. The operating potential of the $Ag_2O$/Ag electrode was about 0.52 V. The potential dropped quickly when the $Ag_2O$/Ag electrode reached its capacity for storage of electrons, and most of the silver-oxide was reduced to silver. At this point, the $Ag_2O/Ag$ electrode requires removal and regeneration with a terminal electron acceptor, such as oxygen (e.g., as shown on FIG. 1B).

Re-oxidation of silver by oxygen to silver-oxide is thermodynamically favorable (ΔG=−22.6 kJ/mol at 25° C. and 1 atm $O_2$) and is therefore expected to occur spontaneously. A thin silver-oxide layer is in fact observed when a clean silver surface is exposed to oxygen at normal pressures. Complete oxidation occurs at 300° C. and 2 MPa $O_2$. Simply bubbling of oxygen through an aqueous solution of silver nanoparticles results in partial oxidation. Three different regeneration methods were investigated: direct exposure to air at room temperature (~20° C.); exposure to air at 90° C.; and immersion in aerated water bubbled with air. In all cases, the open circuit potential of the $Ag_2O/Ag$ electrode returned to about 0.48 V vs. SHE after regeneration, but the operating potential dropped significantly when a reducing current was applied. The oxidation capacity—defined as the amount of charge delivered to the cathode before the operating potential of the $Ag_2O/Ag$ electrode fell to values less than 0.3 V vs. SHE—increased with the regeneration time. After a 24-hour regeneration period, the oxidation capacity could last for a few minutes when the reducing current was 0.1 $mA/cm^2$. Direct oxidation through such means could avoid use of noble metal catalysts for electrochemical reduction of $O_2$. Electrochemical re-oxidation is also an option for regeneration. Because this step occurs outside the MB, temperature, pressure, and electrolyte composition can be optimized. As proof-of-concept, we used a sodium hydroxide solution (NaOH, 1 M, pH 14) as the electrolyte and a commercially available Pt electrode for oxygen reduction. As shown by the polarization curves in FIG. 3B, a voltage of 0.20-0.35 V was needed at a regeneration current of 0.01-1 $mA/cm^2$. After regeneration, the $Ag_2O/Ag$ electrode was reinstalled in the MB with resumption of energy recovery (FIG. 3A). Because the $Ag_2O/Ag$ redox couple is reversible, the charge-discharge of $Ag_2O/Ag$ electrode in a NaOH electrolyte had a coulombic efficiency >97% over 200 cycles. A 20% drop in charge storage capacity occurred over the first 30 cycles—probably due to some loss of $Ag_2O/Ag$, but ~70% of the capacity remained after 200 cycles.

Figure 3C:
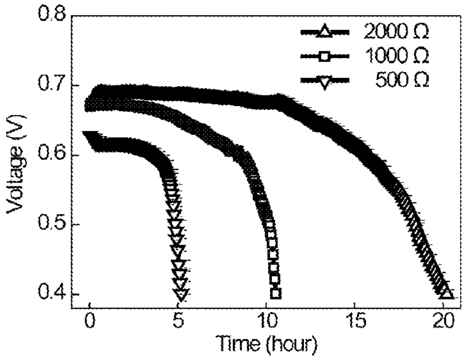
Figure 3D:
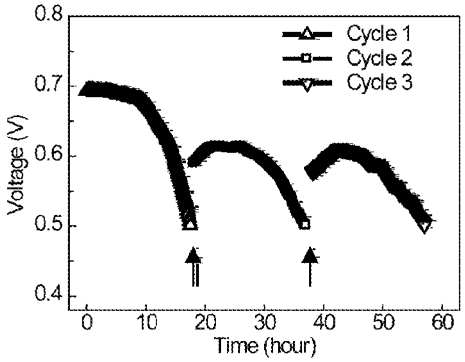

Plate-shaped MBs with compact design (3×3×0.3 $cm^3$) were constructed with pre-colonized microbial anodes (3×3 $cm^2$) and silver-oxide cathodes (3×3 $cm^2$) to estimate the efficiencies of MBs. The chamber was filled with 2 mL of glucose solution with an initial chemical oxygen demand (COD) of 1170 mg/L. In this case, the oxidation capacity of the $Ag_2O/Ag$ electrode was sufficient to maintain a stable operating potential for one cycle, while the potential of the microbial anode changed as glucose concentration became limiting. Output voltage of the cell decreased. The open circuit voltage was 0.78 V. With a 2000Ω external loading, the maximum output voltage was 0.69 V (FIG. 3C). When the voltage dropped to 0.4 V, solution COD decreased to 130 mg/L, a removal efficiency of 89%. The total charge, calculated by integrating the generated current over time, established that ~92% of the organics removed were oxidized and contributed to current generation. No microbial growth was observed on the $Ag_2O/Ag$ cathode. Operation at two other loadings (1000Ω and 500Ω) was also investigated (FIG. 3C) with similar results. COD removal efficiencies were 91% and 92% for 1000Ω and 500Ω loadings, respectively, and, in both cases, coulombic efficiency was 91%. FIG. 3D shows the voltage profiles of plate-shaped MBs in three consecutive cycles with a 2000Ω loading. A higher voltage cut-off of 0.5 V was applied to maintain microbial activity over multiple cycles. The performance of the later two cycles was similar. The maximum output voltages (~0.62 V) were not as high as the first cycle, probably because there was insufficient time for recovery of microbial activity before glucose concentration again became limiting. COD removal efficiencies were 85% (Cycle 1), 84% (Cycle 2), and 82% (Cycle 3), and coulombic efficiencies were 91-92% in all cases.

Figure 4:
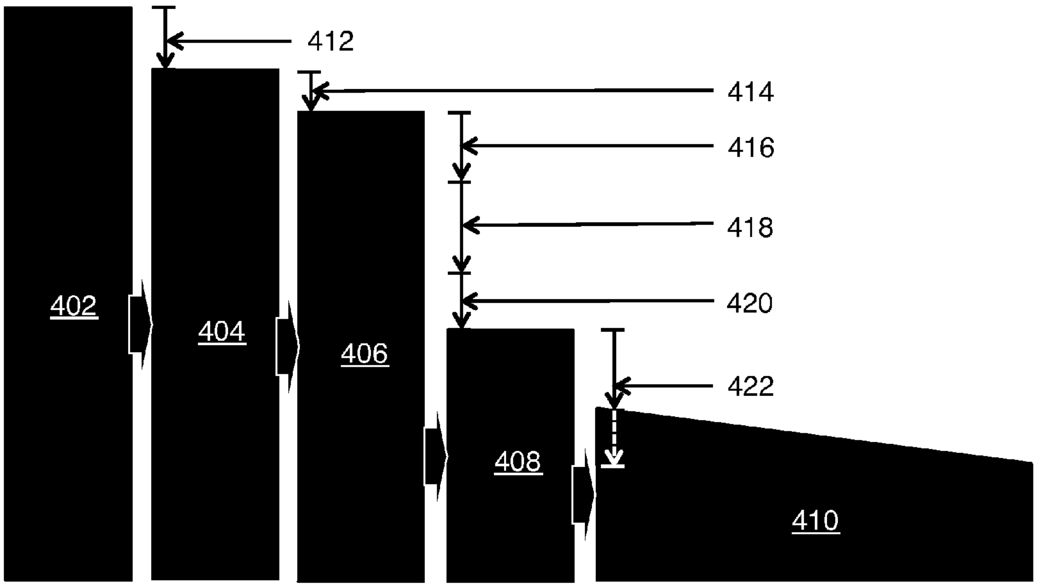
FIG. 4 shows results of an exemplary energy efficiency calculation for microbial batteries.

FIG. 4 summarizes the energy flow of the MB with a 2000Ω load (FIG. 3C) followed by electrochemical regeneration of the solid-state ($Ag_2O/Ag$) electrode. The heights of the boxes indicate the energy percentages. For this analysis, we consider all of the added glucose and assume that the total chemical energy 402 is the combustion energy ($2.8\times10^3$ kJ/mol for glucose). This assumption enables comparison with energy conversion by methane fermentation with combined heat and power (CHP). The energy balance is as follows: about 11% (412) of the energy in the added glucose is retained in the electrolyte as residual electron donors; of the 89% (404) removed, ~7% (414) is used for biomass synthesis, leaving ~82% (406) for microbial energy production; ~12% (416) is used for microbial metabolism; overpotential at the solid-state electrode resulted in another 16% (418) energy loss; and 10% (420) energy loss resulted from losses due to internal resistance and diffusion limitations. The resulting gross efficiency of electrical energy production was ~44% (408). This number increases to ~49% if the energy recovered is divided by the energy of the organic matter consumed. The energy required for electrochemical re-oxidation ranged from ~14%-24% (422), depending upon the current density (0.01-1 $mA/cm^2$) applied. This step involves a trade-off: re-oxidization at higher current densities consumes more energy, but is more rapid, so less electrode material is required for continuous electricity generation. The net energy conversion efficiency for energy production and electrode re-oxidation was ~20%-30% (410) based on the organic matter added and ~21%-33% based on the organic matter consumed. These values are comparable to methane fermentation with CHP.

The MB offers an alternative for energy recovery from soluble electron donors. Compared to methane production with CHP, it is likely to have fewer safety concerns and reduced environmental impact because methane production is avoided. The single-chamber design without ion-exchange membranes should be adaptable to different scales of operation. An obvious application is removal of biodegradable organics from domestic and industrial wastewaters. The same plate-shaped MB was tested with real domestic wastewater collected from a sewer at Escondido Village at Stanford University.

Figure 5:
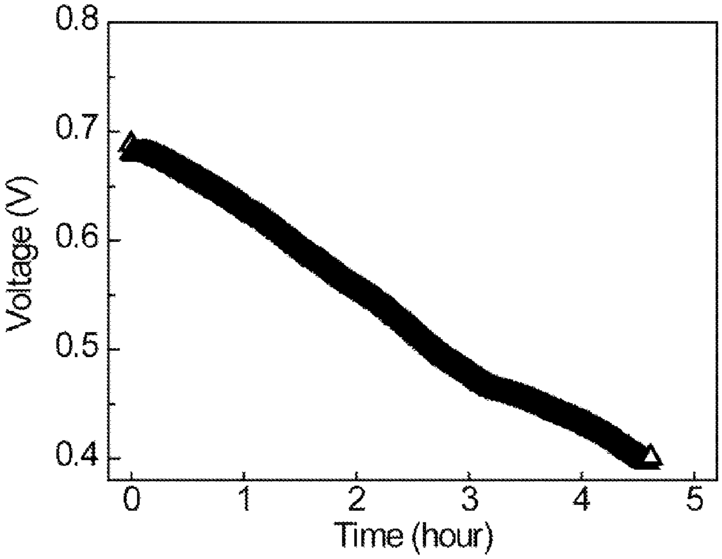
FIG. 5 is measured voltage vs. time for a microbial battery operating with waste water as fuel.

FIG. 5 illustrates the voltage profile for oxidation of this wastewater-fed MB with a 2000Ω external loading. The MBs were equipped with pre-colonized carbon cloth anodes and silver-oxide cathodes. The feed was domestic wastewater with an initial COD of 390±38 mg/L. The voltage profile decreased gradually from 0.69 V to 0.4 V during operation. This differed from the voltage profile of the glucose-fed MB, where a stable voltage plateau was followed by a decrease as glucose levels became limiting. This difference was likely due to differences in the biodegradability of municipal wastewater organics, with initial oxidation of readily biodegradable substances followed by oxidation of less biodegradable substances. The COD removal efficiency was 53%, from 390 mg/L to 170 mg/L, and the coulombic efficiency was 84%. The efficiency of electrical energy conversion was 38% based on the combustion enthalpy of COD removed or 22% based on total COD in the wastewater. The results demonstrate that the MB concept can be generalized for treatment of complex organic mixtures. For larger scale applications, however, high capital cost of the silver based electrode would be prohibitive. More cost-effective materials are preferred for fabrication of rechargeable solid-state electrodes.

4) Materials and Methods

Silver-oxide electrodes were prepared using a slurry coating process followed by electrochemical oxidation. Silver nanoparticles (20 nm, SkySpring Nanomaterials Inc., 85% wt.) were mixed with conductive carbon black (Super-P, TIMCAL, 8% wt.) and polyvinylidene fluoride (PVDF, Sigma-Aldrich, 7% wt.) in N-methylpirrolidone (NMP, Sigma-Aldrich). The mixture was stirred overnight and successively coated onto a carbon cloth (Fuel Cell Earth LLC). The electrodes were dried in vacuum, resulting in a mass loading of ~20 mg/cm$^2$. The silver electrode was then oxidized electrochemically in a sodium hydroxide solution (NaOH, 1 M, pH 14) at a current density of 1 mA/cm$^2$. The process was stopped after the potential increased to 0.3 V vs. Ag/AgCl to avoid formation of silver-peroxide (AgO). A carbon cloth supported platinum (Pt) electrode (Pt loading 0.5 mg/cm$^2$, Fuel Cell Earth LLC) was used for oxygen reduction. Carbon cloth microbial anodes were employed. These anodes were colonized in traditional H-shaped MFCs for more than one month until a stable current was obtained. Titanium wires were used to connect the electrodes to the external circuits.

Plate-shaped MBs were manufactured at the Varian Physics Machine Shop at Stanford. Two pieces of plexiglass, with a groove of 3 cm×3 cm×0.15 cm on each piece, were screwed together to form a chamber of 3 cm×3 cm×0.3 cm. A pre-colonized carbon cloth microbial anode (3 cm×3 cm) and a carbon cloth supported silver-oxide cathode (3 cm×3 cm) were installed on each side with a separation distance of about 0.2 cm. Different resistors (500-2000Ω) were applied as external loading and the output voltages recorded. The MBs were first filled with a phosphate buffer (PBS, 200 mM, pH 7). Oxidation of residual organic matter was accompanied by a decline in output voltage to 0.4 V. The electrolyte volume (2 ml) was replaced with fresh PBS buffer containing ~1 g/L glucose, and the current generation cycle was repeated. After the output voltage returned to 0.4 V, operation was stopped and the electrolyte analyzed.

Electrochemical characterization was achieved with a three-electrode setup using a BioLogic VMP3 potentiostat-galvanostat equipped with electrochemical impedance spectroscopy (EIS) board. A double junction Ag|AgCl|KCl (3.5 M) reference electrode (RE) was used for the measurement, with a Pt counter electrode (CE) used as necessary. EIS was conducted at the open circuit voltage (OCV) in the frequency range of $10^5$-0.1 Hz with a 10 mV peak-to-peak sinusoidal potential perturbation. Cyclic voltammetry tests were performed on the microbial anodes over the potential range −0.5 V to −0.2 V vs. RE at a sweep rate of 1 mV/s. Polarization curves were obtained by changing the current density from 0.01 to 1 mA/cm$^2$ and monitoring potential until equilibrium was observed (at least 10 minutes). Oxygen reduction measurements were performed while the electrolyte was bubbled with air (~100 mL/min). X-ray diffraction measurements (XRDs) were carried out with a PANalytical X'Pert (Ni-filtered Cu Kα radiation), and scanning electron microscope (SEM) images were taken by FEI Nova NanoSEM. For SEM, the anode sample was pretreated with a fixing and critical point drying process. The chemical oxygen demand (COD) of the electrolyte was determined using a HACH COD analysis kit (HACH, Co., USA).

The invention claimed is:

1. A method for converting chemical energy to electrical energy, the method comprising:

providing a microbial battery comprising:

an anode configured such that microbial activity at the anode provides electrons to an external circuit;

a cathode configured to receive the electrons from the external circuit and change its composition from an oxidized cathode composition to a reduced cathode composition; and a reaction chamber, wherein the anode and the cathode are disposed in an aqueous solution in the reaction chamber;

wherein the cathode is configured to be changed from the reduced cathode composition to the oxidized cathode composition in a separate oxidation process outside the microbial battery;

i) operating the microbial battery until the cathode at least partially has the reduced cathode composition, thereby providing a reduced cathode;

ii) removing the reduced cathode from the microbial battery;

iii) oxidizing the cathode until the cathode at least partially has the oxidized cathode composition, thereby providing an oxidized cathode;

iv) adding the oxidized cathode to the microbial battery; and repeating steps i, ii, iii, and iv in sequence one or more times.

2. The method of claim 1, wherein microbial activity at the anode includes biological metabolism of one or more reduced species selected from the group consisting of: organic compounds, reduced nitrogen compounds, reduced sulfur compounds, reduced metals, reduced metalloids, and hydrogen.

3. The method of claim 1, wherein the oxidizing the cathode comprises one or more processes selected from the group consisting of: corroding the cathode by exposure to one or more oxidants, oxidizing the cathode with an electrochemical reaction, and oxidizing the cathode with microbially mediated oxidation.

4. The method of claim 1, wherein the oxidizing the cathode comprises use of a catalyst.

5. The method of claim 1, wherein an oxidant used to oxidize the cathode is selected from the group consisting of: oxygen, water, carbon dioxide, sulfates, sulfites, nitrates, nitrites, perchlorates, and chlorates.

* * * * *